Aug. 21, 1951  McCOY EVANS  2,565,423
LIQUID LEVEL GAUGE AND AERATOR
Filed April 15, 1948
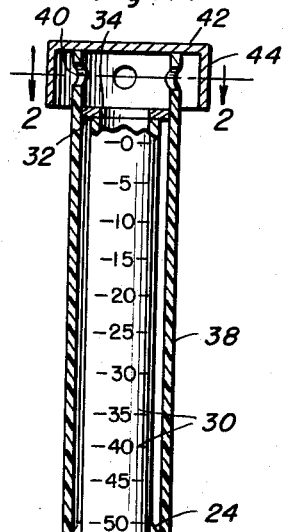
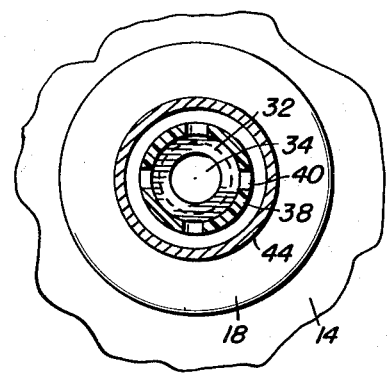
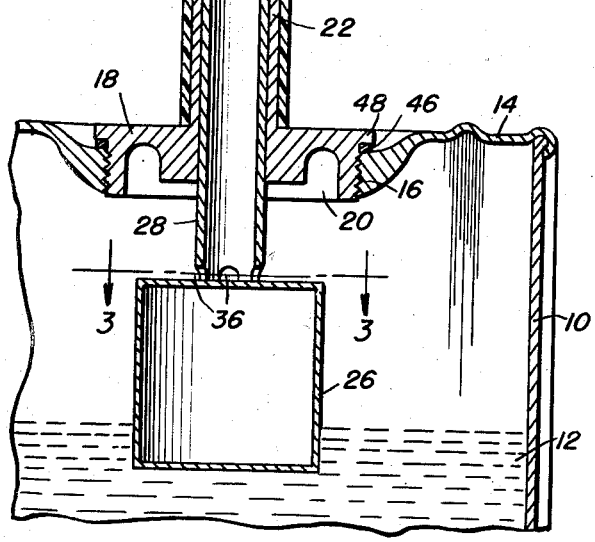
McCoy Evans
INVENTOR.

Patented Aug. 21, 1951

2,565,423

UNITED STATES PATENT OFFICE 2,565,423

LIQUID LEVEL GAUGE AND AERATOR

McCoy Evans, Bremerton, Wash., assignor of fifty per cent to Richard F. Cook, Bremerton, Wash.

Application April 15, 1948, Serial No. 21,159

3 Claims. (Cl. 73—322)

This invention relates generally to gauges, and more particularly to a liquid level gauge and aerator combination adapted for use with tanks containing liquid to indicate the level of the liquid in the tank and to allow atmospheric air to enter the top of the tank to replace liquid drawn therefrom.

A primary object of this invention is to provide an air vent and liquid level gauge in a conveniently mountable unit, the combined device being usually securable into a vent ordinarily provided in the top of such tanks.

Another object of this invention is to provide an aerator in combination with a liquid level gauge, the former having means to prevent undue moisture and dust entrance into the tank.

Still another object of this invention is to provide a combined device as mentioned above which incorporates a well protected calibrated indicator tube and a float arranged and constructed so that air entering the top of the indicator tube is allowed to escape into the tank above the level of the liquid therein, thus preventing a liquid lock developing in the aerating means for the tank.

And a last object to be mentioned specifically is to provide a device of this nature which is relatively inexpensive and practicable to manufacture, which is simple, accurate and convenient to install and to use, and which will give generally efficient and durable service.

With these objects definitely in view, this invention resides in certain novel features of construction, combination and arrangement of elements and portions as will be hereinafter described in the specification, particularly pointed out in the appended claims, and illustrated in the accompanying drawings which form a material part of this application, and in which:

Figure 1 is a central vertical cross sectional view of an upper portion of a tank with liquid therein and with this invention operatively mounted thereon;

Figure 2 is a horizontal transverse sectional view of the weather and dust cap and contiguous portions, the view being taken on a plane through the line 2—2 in Figure 1; and, Figure 3 is a horizontal sectional view, taken on a plane through the line 3—3 in Figure 1.

Similar characters of reference designate similar or identical elements and portions throughout the specification and throughout the several views in the drawing.

Referring now to the drawing, the environment wherewith this invention is adapted to be used will ordinarily include a tank 10 which will be partially or wholly filled with liquid 12 and the tank will have a tank top 14 having an access opening, sometimes comprising the filler opening, with internal threading 16.

An externally threaded adaptor plug 18 is engageable either directly in the threaded access opening 16 of the tank top, or indirectly mounted therein by another adaptor ring or the like, which last mentioned means is thought unnecessary to be illustrated in the drawing. The adaptor plug 18 is centrally recessed on the lower side thereof, as at 20, to minimize the weight of the plug, and the plug may be formed integral with an upstanding guide tube 22 which terminates in a bevelled upper edge portion 24. The guide tube 22 will be of opaque material and the length thereof will be determined as necessitated to provide proper telescopic mounting for an indicator tube 28 disposed in the guide tube 22.

The float 26, sized so as to be easily inserted through the access opening 16, has rigidly secured thereto on the upper surface thereof the above mentioned indicator tube 28. The indicator tube is provided with suitable calibrations 30 preferably arranged to facilitate the reading of the amount of liquid in the tank directly, that is, the graduated scale will have its zero at the top of the indicator tube and the bevelled edge 24 of the guide tube 22 will be used as an index means in relation to the calibrations 30 in an obvious manner. A stop 32, comprising an outturned flange on the upper end of the indicator tube 28, or a washer secured in this position, will engage the bevelled edge 24 of the guide tube when the level of the fluid 12 falls and the float 26 carries the indicator tube into its lowermost position.

The indicator tube 28 is hollow throughout its length and is open at the top as indicated at 34. The indicator tube is also apertured as at 36 adjacent the lower end thereof and adjacent the upper portion of the float 26. This construction will be seen to allow exit of air from the tube 28 into the tank 10 above the level of the fluid 12 at all times, the air entering the open end 34 of the indicator tube and escaping through the apertures 36.

An outer transparent tube 38, preferably of an internal diameter very slightly greater than the external diameter of the guide tube 22, is frictionally engaged with this guide tube and the lower end of the outer tube 38 will abut the upper surface of the adaptor plug 18, thus facilitating the removal of this outer transparent tube 38 for cleaning or for any other necessary purpose.

A plurality of apertures 40 are provided in the upper end of the outer transparent tube 38 and this upper end is closed by a weather and dust cap 42, secured thereon by any suitable means or cast integrally therewith and having a depending annular flange 44 covering the apertures 40, to prevent rain or dust from entering the tank 10.

The operation of this invention will be clearly understood from a consideration of the foregoing description of the mechanical details thereof, taken in connection with the drawing and the recitation of the objects sought to be achieved by this invention. It may be added that suitable gaskets such as that indicated at 46 may be inserted between an annular flange 48 on the adaptor plug 18 and the tank top 14, and many other minor adaptations and alterations in the detail of construction and proportionment of the various elements of this invention may be resorted to without departure from the spirit and scope thereof. Accordingly, the scope of this invention should be limited only as determined by a proper interpretation of the terminology used in the subjoined claims.

Having described the invention, what is claimed as new is:

1. A liquid level gauge and aerator for use with a tank containing liquid, comprising an adaptor plug securable in the top of a tank, a float having an indicator tube carried thereby, an open top guide tube carried by said plug and guiding said indicator tube in telescopic relation therewith, said indicator tube being open at the top and open adjacent said float, said indicator tube having calibrated indicia thereon, whereby said calibrated indicia may be read as related to the upper end of said guide tube and air may enter and leave said tank through the indicator tube, whereby the internal and external pressures of the tank are equalized and incorrect liquid level readings due to unequalized internal and external pressures is prevented, said indicator tube having a stop on its upper end to engage the upper end of the guide tube said stop comprising an outwardly extending flange, and an outer tube terminally secured to the adaptor plug and extending coaxially and externally of the indicator tube, said outwardly extending flange slidably and internally engaging said outer tube, said outer tube having a portion thereof transparent to allow vision of the indicator tube, and said outer tube having apertures near its upper end.

2. A liquid level gauge and aerator for use with a tank containing liquid, comprising an adaptor plug securable in the top of a tank, a float having an indicator tube carried thereby, a guide tube on said plug and guiding said indicator tube in telescopic relation therewith, said indicator tube being open at the top and open adjacent said float, said indicator tube having calibrated indicia thereon, whereby said calibrated indicia may be read as related to the upper end of said guide tube and air may enter and leave said tank through the indicator tube, whereby the internal and external pressures of the tank are equalized and incorrect liquid level readings due to unequalized internal and external pressures is prevented, an outer transparent tube removably and coaxially mounted on said guide tube and extending above said guide tube, and apertures in the top end of the outer tube.

3. A liquid level gauge and aerator for use with a tank containing liquid, comprising an adaptor plug securable in the top of a tank, a float having an indicator tube carried thereby, a guide tube on said plug and guiding said indicator tube in telescopic relation therewith, said indicator tube being open at the top and open adjacent said float, whereby air may enter and leave said tank through the indicator tube, whereby the internal and external pressures of the tank are equalized and incorrect liquid level readings due to unequalized internal and external pressures is prevented, an outer transparent tube removably and coaxially mounted on said guide tube and extending above said guide tube, apertures in the top end of the outer tube, and a weather cap on the upper end of said outer tube and having a depending flange covering said apertures in the top end of the outer tube.

McCOY EVANS.

REFERENCES CITED

The following references are of record in the file of this patent:

UNITED STATES PATENTS

| Number | Name | Date |
| --- | --- | --- |
| 956,907 | Smith | May 3, 1910 |
| 1,386,833 | Beardmore | Aug. 9, 1921 |

FOREIGN PATENTS

| Number | Country | Date |
| --- | --- | --- |
| 376,945 | Great Britain | July 21, 1932 |